United States Patent [19]
Mattson

[11] 4,301,976
[45] Nov. 24, 1981

[54] TAPE CARTRIDGE

[75] Inventor: Glenn A. Mattson, Indianapolis, Ind.

[73] Assignee: RCA Corporation, New York, N.Y.

[21] Appl. No.: 49,584

[22] Filed: Jun. 18, 1979

[51] Int. Cl.³ .................... G11B 23/10; B65H 17/48
[52] U.S. Cl. ............................................. 242/55.19 A
[58] Field of Search ................. 242/55.19 A, 55.19 R

[56] References Cited

U.S. PATENT DOCUMENTS

| | | |
|---|---|---|
| 3,134,551 | 5/1964 | Eldridge et al. |
| 3,341,143 | 9/1967 | Nieland et al. ............... 242/55.19 A |
| 3,718,297 | 2/1973 | Eagle ........................... 242/55.19 A |
| 4,015,790 | 4/1977 | Gelardi et al. ............... 242/55.19 A |
| 4,022,397 | 5/1977 | Lowry .......................... 242/55.19 A |

OTHER PUBLICATIONS

RCA Technical Communication, "The Eight Track Cartridge; Putting It All Together", J. C. Ruda, pp. 30-33.

Primary Examiner—Stanley N. Gilreath
Attorney, Agent, or Firm—Eugene M. Whitacre; A. L. Limberg; J. M. O'Meara

[57] ABSTRACT

Within a single pack tape cartridge, a bearing surface is integrated on the cartridge case to preclude segments of the tape pack from telescoping into clearance space and thereby a retaining ring is eliminated from the tape cartridge assembly.

4 Claims, 4 Drawing Figures

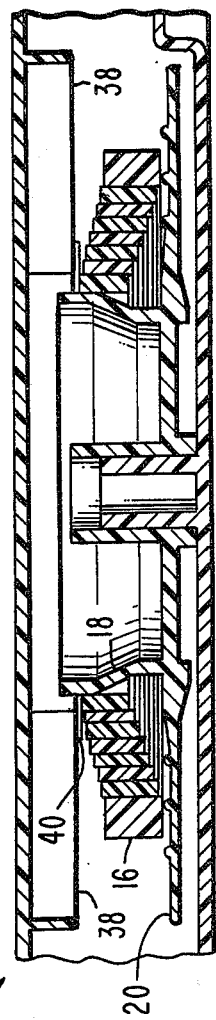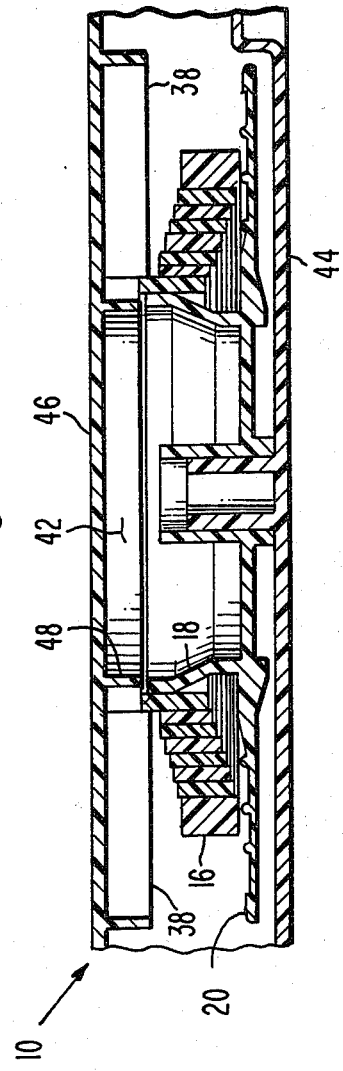

TAPE CARTRIDGE

The present invention relates to a tape cartridge of the type wherein the tape travels in a continuous loop within a case and is wound in a single circular pack about a reel, with the tape pack having a tape output at an inside diameter thereof and a tape input at an outside diameter thereof; and wherein the case includes clearance structure to provide space in which unwound tape may accumulate and the width of the tape is traversed from the tape output at one side of the case to the tape input at the other side thereof.

In this type of cartridge, the tape must be loosely wound about the reel so that it can be easily pulled from the tape output at the inside diameter of the tape pack. Because of this loosely wound condition, tape becomes unwound from the pack under various conditions. Although this unwound tape accumulates in the space that is provided by the clearance structure within the case, when the case is not properly oriented, segments of the wound tape closest to the hub of the reel can slip completely out of the pack into this space through the clearance that is necessary between the reel and the clearance structure. Such slippage by the tape may result in a jammed cartridge and in prior art cartridges, tape retaining rings have been disposed to bridge the space between the hub and the clearance structure. However, these rings are separately assembled items in the tape cartridges and therefore, add significantly to the production costs thereof.

Jamming due to tape slippage is precluded in the tape cartridge of the present invention by incorporating a bearing surface on the case thereof for supporting the tape pack between the hub and the clearance structure to preclude any tape separation from the pack when the case is orientated to cause telescopic action of tape from the pack. In one preferred embodiment, a base and a cover are included in the case with the reel being affixed to the base while the clearance structure and the bearing surface are integrally disposed on the cover.

In the drawings:

FIG. 3 is a cross-sectional view through the tape cartridge of FIG. 1, showing the prior art solution to the problem of segment slippage from the tape pack therein;

FIG. 4 is a cross-sectional view through the tape cartridge of FIG. 1, showing the solution to the problem of segment slippage from the tape pack as provided by the improvement of the invention.

Figure 1:
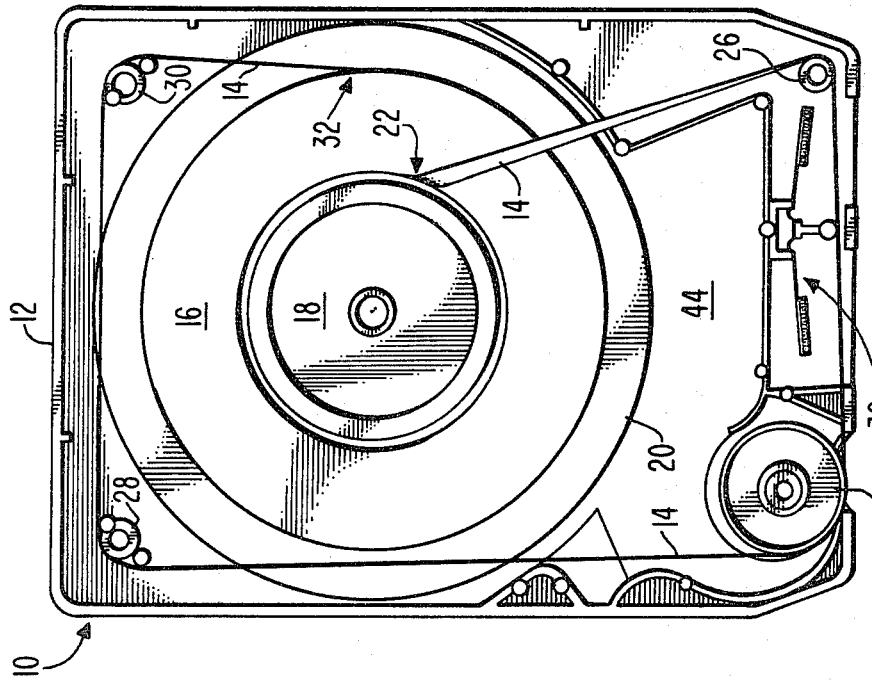
FIG. 1 is an interior view of a conventional tape cartridge.

The tape cartridge 10 shown in FIG. 1 is of the conventional type having a tape travel system disposed within a case 12. In this system a tape 14 travels in a continuous loop and is wrapped in a single circular pack 16 about a hub 18 of a reel 20. The tape 14 is pulled from the inside diameter of the pack 16 at a tape output position 22 when a capstan driver within a tape player (not shown) is rotated against a pinch roller 24 and it passes around guide posts 26, 28 and 30 to the outside diameter of the pack 16 at a tape input position 32. The reel 20 is rotatably affixed to the case 12, while a spring assembly 36 against which a pickup head in the tape player locates, is also disposed within the case 12.

Figure 2:
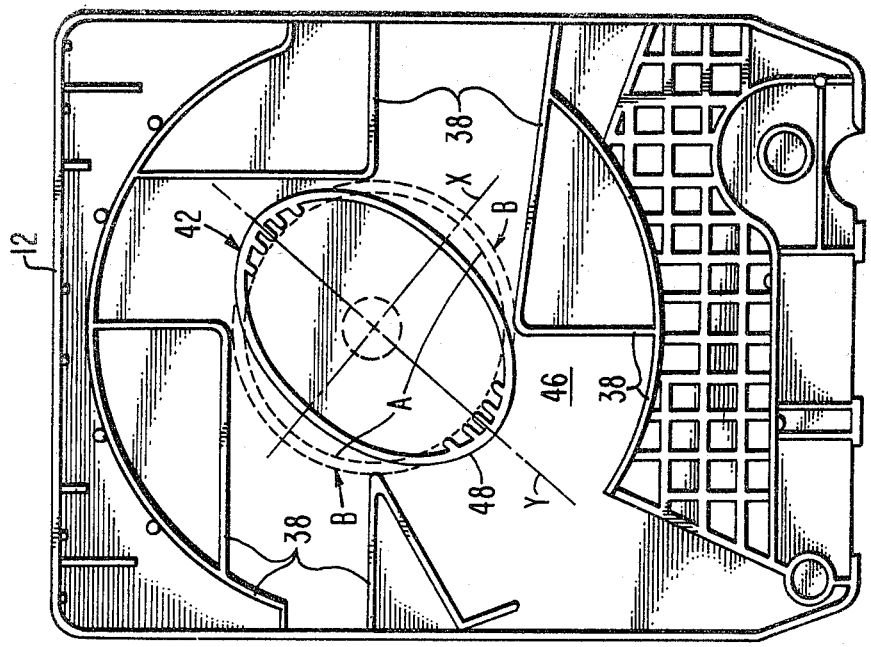
FIG. 2 is an interior view of the upper portion of tape cartridge of FIG. 1, showing the improvement of the present invention incorporated therein.

Because the tape 14 is pulled from the inside diameter of the pack 16, it is loosely wound around the hub 18 of the reel 20. During operation of the tape cartridge 10, the pack 16 does not move in a perfectly circular path about the rotational axis of the reel 20 through the case 12 and it comes into contact with the hub 18. However, such contact causes the reel 20 to rotate and therefore, the frictional influences on the pack 16 are reduced to a minimum. Because the width of the tape 14 must traverse from the tape output position 22 at one side of the case 12 to the tape input position 32 at the other side of the case 12, clearance structure 38 is disposed within the cartridge 10, as shown in FIG. 2, to provide the space in which this traversal can be made. It should be understood without further explanation that the case 12 is opened like a book to provide the views of FIGS. 1 and 2.

During handling or mishandling and on rare occasions during operation, the tape 14 will become unwound at the tape input position 32 and the space provided by the clearance structure 38 is made sufficiently high above the pack 16 to accommodate unwound tape. However, clearance must be provided between the hub 18 and the clearance structure 38, and segments of wound tape 14 closest to the hub 18 can slip completely out of the pack 16 through this clearance and into the space that is provided by the clearance structure 38, to jam the cartridge 10. As shown in FIG. 3, this tape slippage problem is resolved in prior art cartridges by incorporating a tape retaining ring 40 to bridge the space between the hub 18 and the clearance structure 38. However, this retaining ring 40 is a separate part within the tape cartridge 10 and therefore it must be inventoried and assembled along with all of the other parts of the tape cartridge 10, so that production costs are significantly affected thereby.

The improvement of this invention to the previously described tape cartridge 10 is shown in FIG. 2 where a bearing surface means 42 is integrally disposed on the case 12 for supporting the tape pack 16 between the hub 18 and the clearance structure 38 to preclude tape 14 from slipping therebetween. With this improvement incorporated therein, the tape cartridge 10 of FIG. 1 operates without jamming in the same manner as described previously, even though the tape retaining ring 40 shown in FIG. 3 has been eliminated therefrom. This is so because the bearing surface means 42 precludes segments of the tape pack 16 from slipping between the hub 18 and the clearance structure 38, as is illustrated in FIG. 4, where the support provided for the tape pack 16 by the bearing surface means 42 is not actually shown but will be explained later in this specification. Therefore, segments of the tape pack 16 will not be separated therefrom and although some minor costs are incurred by incorporating the bearing surface means integrally on the case, significant cost savings are realized due to the elimination of the retainer ring 40 from the tape cartridge 10.

Although many embodiments of the tape cartridge 10 are possible with the bearing surface means 42 incorporated therein, one preferred embodiment thereof is shown in FIGS. 1 and 2 wherein the case 12 includes a base 44 and a cover 46. The base 44 has the previously described tape travel system assembled thereto while the cover 46 is a molded part having the clearance structure 38 and the bearing surface means 42 included thereon. Consequently, the tape travel system may be completely assembled to the base 44 without the tape retaining ring 40 shown in FIG. 3 and then the cover 46 may be joined to the base 44, as is shown in FIG. 4.

A particular embodiment of the bearing surface means 42 is shown in FIG. 2 wherein a continuous rib 48 is disposed on the cover 46 in a non-circular pattern about the rotational axis of the reel 20 through the case 12. As shown in FIG. 4, the height of the rib 48 only leaves clearance for the hub 18 within the assembled tape cartridge 10 and as shown in FIG. 2, the non-circular pattern of the continuous rib 48 extends from within the projected diameter of the hub 18 to beyond the least radial distance of the clearance structure 38 from the rotational axis of the reel 20 through the case 12. In FIG. 2, the projected diameter of the hub is shown as a dotted circle A, while the least radial distance of the clearance structure 38 from the rotational axis of the reel 20 is shown as dotted arc portions B and the difference therebetween is the space into which segments of the tape pack could slip if precautions thereagainst were not taken. The segment of the tape pack 16 between the hub 18 and the clearance structure 38 is not supported by those portions of the rib 48 within the projected diameter of the hub 18, as is shown in FIG. 4. However, it is supported by all portions of the rib 48 which extends from that diameter to beyond the least radial distance of the clearance structure 38 from the rotational axis of the reel 20 through the case 12. Therefore, the segment of the tape pack 16 between the hub 18 and the clearance structure 38 is precluded from slipping completely out of the pack 16 without using the tape retaining ring 40 of prior art embodiments.

Although the non-circular pattern of the rib 48 may have many different configurations, in the preferred embodiment of FIG. 2, it is substantially configured as an ellipse. The minor dimension of the ellipse along an axis X is less than the diameter of the hub 18 while the major dimension thereof along an axis Y is greater than the least radial distance from the rotational axis of the reel 20 through the case 12 to the clearance structure 38. In this embodiment, the height of the hub 18 along the rotational axis of the reel 20 extends to overlap the clearance structure 38 within the cartridge 10. While rotating therefore, the hub 18 wipes against any accumulation of unwound tape 14 in the vicinity of the minor elliptical dimension and thereby precludes binding of that tape 14 to the rib 48. However, the height of the hub 18 may be shortened relative to that encountered in prior art tape cartridges to closely simulate the containment of the tape pack 16 which is attained with the tape retaining ring 40 of the prior art as can be appreciated by comparing FIGS. 3 and 4.

Those skilled in the art will realize without further explanation that this invention has been disclosed herein by describing only a few embodiments thereof and numerous changes in the details of construction and the combination or arrangement of parts could be made in the described embodiments without departing from the true scope and spirit of the invention. Therefore, the present disclosure should be construed as illustrative rather than limiting.

What I claim is:

1. In a tape cartridge of the type wherein the tape travels in a continuous loop within a case and is wound in a single circular pack about a hub of a reel, with the tape pack having a tape output at an inside diameter thereof and a tape input at an outside diameter thereof; and wherein the case includes clearance structure to provide space in which unwound tape may accumulate and the width of the tape may traverse from the tape output at one side of the case to the tape input at the other side thereof, the improvement comprising:

bearing surface means integrally disposed on the case for supporting the tape pack between the reel hub and the clearance structure to preclude segments of the tape pack from slipping therebetween, said bearing surface means having separate portions with each said portion extending relative to the reel hub center from a location on a circle of no greater diameter than the diameter of the reel hub to a location on a circle of no less diameter than the circle at which the clearance structure in closest proximity to said portion of said bearing surface means is located.

2. The tape cartridge of claim 1 wherein the case includes a base and a cover, said base having the reel affixed thereto, said cover having the clearance structure and said bearing surface means included thereon.

3. The tape cartridge of claim 2 wherein a continuous rib is disposed in a non-circular pattern on said cover as said bearing surface means.

4. The tape cartridge of claim 3 wherein the configuration of said continuous rib is substantially elliptical with the minor dimension of the ellipse being less than the diameter of the reel hub while the major dimension of the ellipse extends radially from the reel hub beyond the closest clearance structure thereto.

* * * * *